Nov. 6, 1934.  B. BEDFORD  1,979,436
BREAD BUTTERER
Filed April 30, 1934   2 Sheets-Sheet 1

Inventor
Ben Bedford
By Clarence A. O'Brien
Attorney

Nov. 6, 1934.  B. BEDFORD  1,979,436
BREAD BUTTERER
Filed April 30, 1934   2 Sheets-Sheet 2

Inventor
Ben Bedford
By Clarence A. O'Brien
Attorney

Patented Nov. 6, 1934

1,979,436

UNITED STATES PATENT OFFICE 1,979,436

BREAD BUTTERER

Ben Bedford, Fayetteville, N. Y.

Application April 30, 1934, Serial No. 723,272

4 Claims. (Cl. 91—51)

The present invention relates to new and useful improvements in butterers particularly for use in restaurants for buttering bread, toast, etc., and has for its primary object to provide, in a manner as hereinafter set forth, a device of this character comprising a novel construction, combination and arrangement of parts through the medium of which the butter is first melted and then applied to the slice of bread or toast in an expeditious manner.

Other objects of the invention are to provide a butterer of the aforementioned character which will be simple in construction, strong, durable, highly efficient and reliable in use, sanitary, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
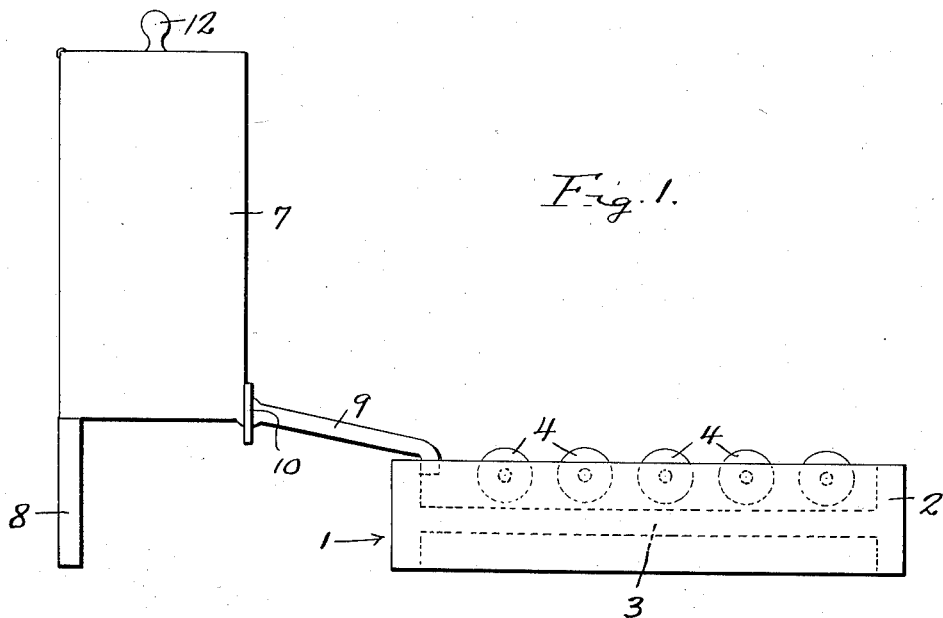
Figure 1 is a view in side elevation of a buttering device constructed in accordance with the present invention.
Figure 2:
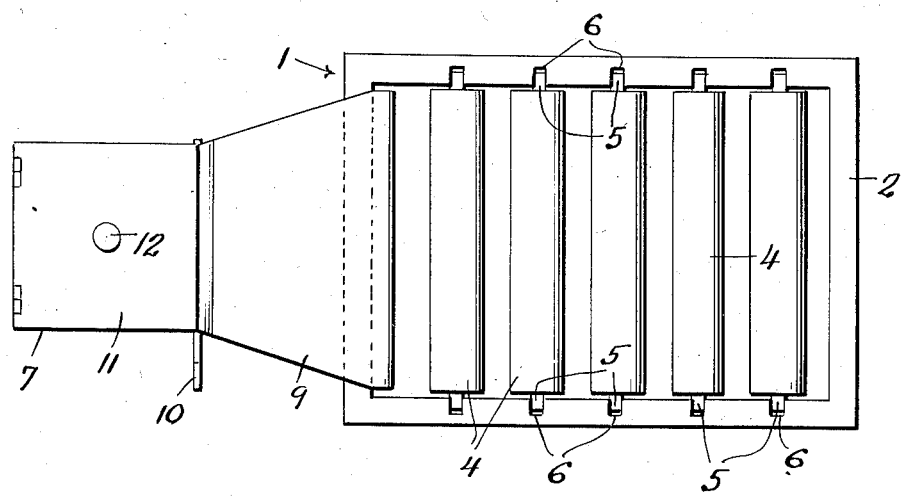
Figure 2 is a view in top plan thereof.

Referring now to the drawings in detail, it will be seen that the embodiment of the invention which has been illustrated comprises what will be hereinafter referred to as a spreader box which is designated generally by the reference numeral 1. The spreader box 1 includes a substantially flat container 2 of suitable material having an elevated bottom 3. Journalled transversely in the container 2 is a plurality of coating rolls 4 which are spaced above the bottom 3. The coating rolls 4 are provided with trunnions 5 on their ends which are journalled in recesses 6 which are provided therefor in the side walls of the container 2.

The reference numeral 7 designates a vertically elongated melting box which is positioned adjacent one end of the spreader box 1. The melting box 7 is supported in elevated position through the medium of legs 8 on one side and a substantially flat, flared discharge spout 9 which projects at an inclination from the opposite side, the free end portion of said discharge spout 9 resting on the adjacent end of the spreader box 1 in a manner to discharge the melted butter thereinto, as will be readily apparent. The comparatively narrow intake end of the spout 9 has rotatably mounted therein a hand operated control valve 10. The melting box 7 further includes a hinged top 11 which is provided with a handle 12.

Figure 3:
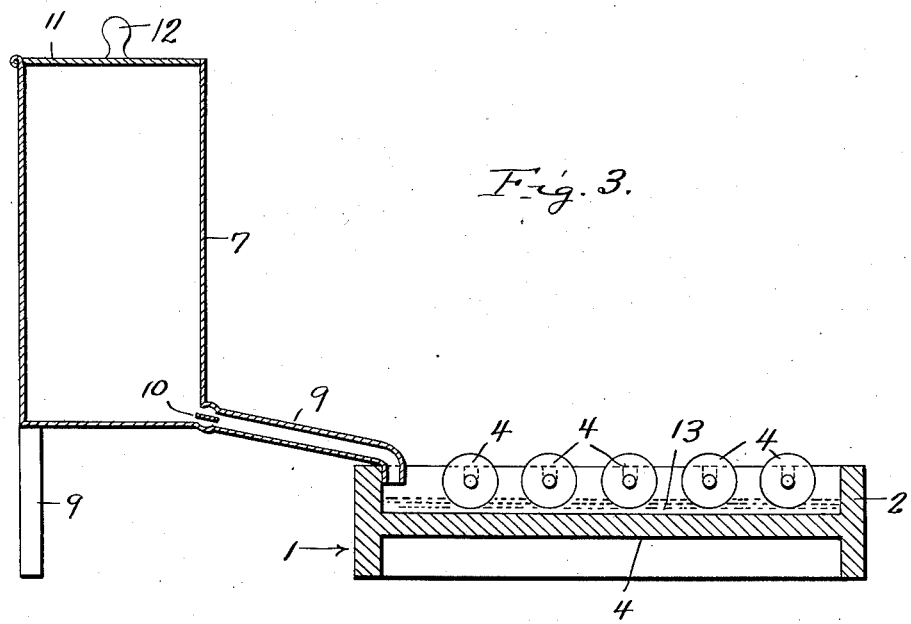
Figure 3 is a view in vertical longitudinal section through the invention.
Figure 4:
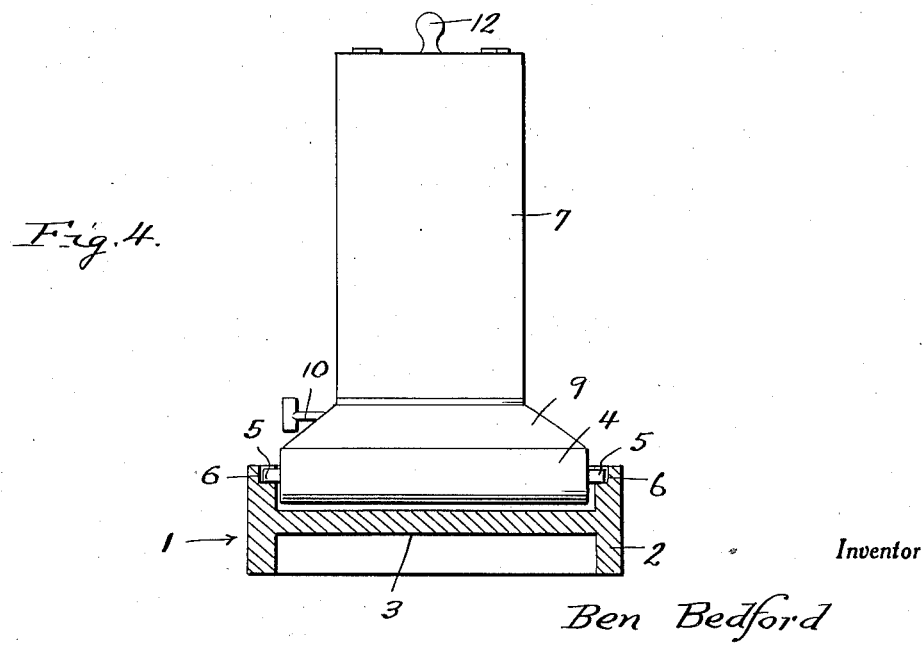
Figure 4 is a cross sectional view.

In use, the hard or substantially solid butter is placed in the box 7 through the open top thereof, after which the hinged cover 11 is closed. Suitable heating means, such as a gas burner or an electric heater, may then be placed under the elevated box 7 for melting the butter therein. The melted butter flows by gravity through the discharge spout 9 into the container 2 of the spreader 1, the quantity of butter passing to said container 2 being controlled by the valve 10. The lower portions of the rolls 4 are submerged in the butter in the container 2 and when a slice of bread is placed on said rolls and moved thereover said slice will be coated with butter in a manner which is thought to be obvious. The slice of bread is moved first toward the melting box 7 and when the forward end of said slice reaches the flat, inclined spout 9 it is deflected upwardly thereby, said spout thus constituting means for supporting this end portion of the slice and maintaining it in shape. The slice may then be moved in a reverse direction over the rolls 4 to complete the coating operation. If an extra thick coating of butter is desired the foregoing operation may be repeated one or more times. A suitable heater (not shown) is to be provided under the spreader box 1 for maintaining the butter therein in a liquid state. This heater is to be controlled by a suitable thermostat (also not shown) for preventing the butter from being brought to too high a temperature and consequently breaking down, thus being rendered unfit for use. In Figure 3 of the drawings the melted butter in the container 2 of the spreader 1 is designated by the reference numeral 13.

It is believed that the many advantages of a bread butterer constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:

1. A buttering device of the class described comprising a container, coating rolls journalled in the container, a melting box mounted adjacent the container, and a substantially flat inclined discharge spout projecting from the melting box and resting on the container for discharging the melted butter thereinto and for supporting one side of the melting box thereon.

2. A bread butterer of the class described comprising a substantially flat container for the reception of melted butter, coating rolls journalled in the container for receiving a slice of bread and applying the butter thereto, an elevated melting box adjacent the container, a substantially flat, inclined discharge spout extending from the melting box and engaged on the container for discharging the melted butter thereinto and for elevating and supporting an end portion of the bread as it is moved over the coating rolls, and a control valve in the discharge spout.

3. A bread butterer of the class described comprising a spreader including a substantially flat container of rectangular plan for the reception of melted butter, said container including an elevated bottom, a plurality of coating rolls journalled transversely in the container and spaced from said bottom, a melting box for the reception of solid butter mounted adjacent one end of the container, said melting box including a hinged top, legs depending from one side of the melting box, a substantially flat, flared, inclined spout projecting from the lower portion of the other side of the melting box and engaged in the container for discharging the melted butter thereinto and for elevating and supporting a portion of the bread after it is moved over the coating rolls, said spout and the legs constituting means for supporting the melting box in elevated position relative to the container, and a control valve operatively mounted in the intake end of the spout.

4. A bread butterer of the class described comprising a container for the reception of melted butter, coating rolls journalled in the container for receiving a slice of bread and applying the butter thereto, an elevated melting box adjacent the container, a substantially flat inclined discharge spout extending from the melting box to the container for discharging the melted butter thereinto and for elevating and supporting an end portion of the slice of bread as it is moved over the coating rolls.

BEN BEDFORD.